(12) United States Patent
Faotto

(10) Patent No.: US 11,639,798 B2
(45) Date of Patent: May 2, 2023

(54) DEVICE FOR SUPPORTING AND FASTENING HEATING PIPES OF A HEATING SYSTEM PLACED IN SUBFLOORS, WALLS OR CEILINGS OF BUILDINGS

(71) Applicant: SILCART S.p.A., Carbonera (IT)

(72) Inventor: Ugo Faotto, Carbonera (IT)

(73) Assignee: Silcart S.p.A., Treviso (IT)

( * ) Notice: Subject to any disclaimer, the term of this patent is extended or adjusted under 35 U.S.C. 154(b) by 83 days.

(21) Appl. No.: 16/349,455

(22) PCT Filed: Nov. 13, 2017

(86) PCT No.: PCT/IB2017/057073
§ 371 (c)(1),
(2) Date: May 13, 2019

(87) PCT Pub. No.: WO2018/087725
PCT Pub. Date: May 17, 2018

(65) Prior Publication Data
US 2020/0191413 A1   Jun. 18, 2020

(30) Foreign Application Priority Data
Nov. 14, 2016 (IT) .......................... 102016000114685

(51) Int. Cl.
*F24D 3/14* (2006.01)
*E04F 13/072* (2006.01)
*E04F 15/18* (2006.01)

(52) U.S. Cl.
CPC ............ *F24D 3/142* (2013.01); *E04F 13/072* (2013.01); *E04F 15/185* (2013.01); *F24D 3/144* (2013.01); *F24D 3/146* (2013.01)

(58) Field of Classification Search
CPC .......... F24D 13/02; F24D 3/142; F24D 3/144; F24D 3/146; F24D 3/12; F24D 3/14;
(Continued)

(56) References Cited

U.S. PATENT DOCUMENTS

| 181,859 A | * | 9/1876 | Linsley | ...................... F24D 3/14 |
| | | | | 237/69 |
| 3,404,061 A | * | 10/1968 | Bochman | .................. D01F 9/12 |
| | | | | 428/143 |

(Continued)

FOREIGN PATENT DOCUMENTS

| DE | 3317131 A1 * | 11/1984 | ............. E04C 2/525 |
| DE | 3317131 A1 | 11/1984 | |

(Continued)

OTHER PUBLICATIONS

International Search Report and Written Opinion for PCT/IB2017/057073 dated Mar. 14, 2018.

*Primary Examiner* — Steven B McAllister
*Assistant Examiner* — Daniel E. Namay
(74) *Attorney, Agent, or Firm* — Thomas | Horstemeyer, LLP

(57) ABSTRACT

The invention relates to a device for supporting and fastening heating pipes (20) of a heating system placed in subfloors, walls or ceilings of a building.
The device comprises:
  a laminar body having a first face and an opposite second face,
  a plurality of fastening elements made in one piece on the first face of the laminar body and configured to fasten said heating pipes on the first face. The invention is characterized in that both the laminar body and the fastening elements of the device are in a mixture
(Continued)

comprising at least one thermoplastic polymer and thermally conductive inorganic fillers.

7 Claims, 3 Drawing Sheets

(58) Field of Classification Search
CPC ...... F24D 3/141; F24D 13/19; F24D 19/0213; F24D 19/12; E04F 15/18; E04F 15/185; E04F 13/072; E04B 5/48; H05B 3/28; Y02B 30/26
USPC ...... 237/69, 8 A, 56, 59; 52/220.1; 138/177; 165/47, 49, 50, 53, 56; 219/213; 432/131
IPC ........... F24D 3/02, 3/12, 3/14, 3/16; E04B 5/48
See application file for complete search history.

(56) References Cited

U.S. PATENT DOCUMENTS

| | | | | |
|---|---|---|---|---|
| 3,419,457 A * | 12/1968 | Bleasdale | ............... | B29D 24/00 428/124 |
| 4,318,258 A * | 3/1982 | Heck | ............... | E04F 13/04 52/309.12 |
| 4,576,221 A * | 3/1986 | Fennesz | ............... | F24D 3/14 165/49 |
| 5,105,595 A * | 4/1992 | Tokei | ............... | E04B 5/48 52/169.5 |
| 5,585,154 A * | 12/1996 | Rhoades | ............... | B32B 3/12 428/35.9 |
| 5,902,762 A * | 5/1999 | Mercuri | ............... | C04B 35/536 501/99 |
| 5,957,378 A * | 9/1999 | Fiedrich | ............... | F24D 3/148 237/69 |
| 8,020,783 B2 * | 9/2011 | Backman, Jr. | ............... | F24D 3/142 237/69 |
| 8,288,689 B1 * | 10/2012 | Adelman | ............... | H05B 3/34 219/213 |
| 8,341,911 B2 * | 1/2013 | Collison | ............... | E04B 1/90 52/403.1 |
| 8,382,004 B2 * | 2/2013 | Asmussen | ............... | F24D 3/148 432/6 |
| 9,328,520 B1 * | 5/2016 | Kriser | ............... | E04F 15/185 |
| 9,404,665 B1 * | 8/2016 | Kayhart | ............... | F24D 3/146 |
| 9,726,383 B1 * | 8/2017 | Bordin | ............... | F24D 3/142 |
| D832,467 S * | 10/2018 | Bordin | ............... | F24D 3/148 D25/158 |
| 10,502,434 B2 * | 12/2019 | Bordin | ............... | F24D 3/12 |
| 2006/0272796 A1 * | 12/2006 | Asmussen | ............... | F28F 21/02 165/53 |
| 2008/0290503 A1 * | 11/2008 | Karavakis | ............... | H01L 23/3737 257/713 |
| 2010/0048752 A1 * | 2/2010 | Vignola | ............... | C08L 31/04 521/139 |
| 2013/0099013 A1 * | 4/2013 | Asmussen | ............... | F28F 13/14 237/69 |
| 2016/0273232 A1 * | 9/2016 | Bordin | ............... | F24D 3/141 |
| 2017/0158898 A1 * | 6/2017 | Xiao | ............... | H01C 7/02 |
| 2017/0307228 A1 * | 10/2017 | Bordin | ............... | H05B 3/28 |
| 2018/0017269 A1 * | 1/2018 | Houle | ............... | E04B 5/48 |

FOREIGN PATENT DOCUMENTS

| | | | | |
|---|---|---|---|---|
| DE | 4201553 A1 * | 5/1991 | ............... | E04C 1/39 |
| DE | 9114591 U1 * | 11/1991 | ............... | F16L 3/18 |
| DE | 20219266 U1 | 3/2003 | | |
| EP | 1912025 A2 | 4/2008 | | |
| EP | 2028425 A2 | 2/2009 | | |
| GB | 2124358 A | 2/1984 | | |

\* cited by examiner

DEVICE FOR SUPPORTING AND FASTENING HEATING PIPES OF A HEATING SYSTEM PLACED IN SUBFLOORS, WALLS OR CEILINGS OF BUILDINGS

CROSS-REFERENCE TO RELATED APPLICATIONS

This application is the 35 U.S.C. § 371 national stage application of PCT Application No. PCT/IB2017/057073, filed Nov. 13, 2017, where the PCT claims the priority to and benefit of Italian Patent Application No. 102016000114685, filed Nov. 14, 2016, both of which are herein incorporated by reference in their entireties.

TECHNOLOGICAL BACKGROUND OF THE INVENTION

Field of Application

The present invention generally relates to heating systems of buildings placed in subfloors or walls. In particular, the invention relates to a device for supporting and fastening heating pipes of a heating system placed in subfloors, walls or ceilings of a building, in which such a support and fastening device has increased properties of thermal conductivity.

Prior Art

Floor or wall heating systems of buildings which use piping or electric cables arranged under the floor of the building or in the cavities of walls for irradiating heat into the rooms, are known and commonly used. Ceiling heating systems of buildings are also known, which use radiant panels fastened to the ceilings of a building or accommodated in specific cavities made in the ceilings.

In particular, water floor heating systems comprise coil piping in which heated water (or other fluids) flows, which is generated by using a traditional boiler, a heat pump, a fireplace stove or by means of photovoltaic solar panels.

Electric floor heating systems generally comprise electric cables operating as electrical resistance or electric heating wires which, if crossed by electric current, heat up due to the Joule effect, thus transferring heat to the surrounding environment.

In terms of the installation of such floor heating systems, generally the coils of the piping in which the heated fluid flows or the heating wires are laid under the floor on panels made of thermally insulating material placed above the slab of the dwelling.

Certain insulation panels of known type which can be used for these purposes in particular comprise a layer made of foam polystyrene having flat opposite surfaces and configured to create a thermally separating insulating structure between the slab and the screed in which the coils or the electric heating wires are laid.

Electric floor heating systems are also known which provide the use of a laminar body made of polymer material fastened, for example glued, to the cement screed or possibly to one of the surfaces of an insulation panel. In particular, such a laminar body made of polymer material is provided with a plurality of projections or bosses configured to promote the fastening of the electric heating wires on the laminar body itself, and accordingly the fastening of the heating wires to the panel.

Floor heating systems have certain advantages with respect to traditional room heating systems such as stoves, fireplaces, thermosiphons, because they do not reduce the living space and therefore ensure increased comfort. However, such systems have certain drawbacks.

Indeed, it has occurred that such floor heating systems are characterized by increased thermal inertia because the heat developed by the heating pipes, that is the pipes in which the heated fluid flows or electric heating wires, is transferred to the surrounding room through the structures in which the heating pipes themselves are positioned. Such a phenomenon of increased thermal inertia is detected in particular in the floor heating systems which use a polymer laminar body provided with bosses, or similar fastening means, for fastening electric heating wires.

In particular, in the case of rooms in which the respective floor heating system are activated only occasionally or only for short periods, it was ascertained that such a thermal inertia of the heating systems causes a significant delay between the instant of time in which the system is started and the instant in which the heat, transferred to the room, can actually be used.

SUMMARY OF THE INVENTION

It is the object of the present invention to devise and provide a device for supporting and fastening heating pipes of a heating system placed in subfloors, walls or ceilings of a building which allows the above drawbacks in reference to known floor heating systems to be at least partially obviated.

In particular, it is an object of the invention to provide a device for supporting and fastening heating pipes of a heating system placed in subfloors, walls or ceilings which has increased properties of thermal conductivity with respect to the support and fastening devices of the known heating pipes used for the same purposes.

Such an object is achieved by means of a device for supporting and fastening heating pipes of a heating system placed in subfloors, walls or ceilings of buildings according to claim 1.

Preferred embodiments of said device for supporting and fastening heating pipes are described in the dependent claims.

An insulation panel including the aforesaid device for supporting and fastening heating pipes in a subfloor, wall or ceiling of a building according to claim 4, is also an object of the present invention. A heating system using the aforesaid device according to claim 5 is also an object of the invention.

BRIEF DESCRIPTION OF THE DRAWINGS

Further features and advantages of the device for supporting and fastening heating pipes for the installation of a heating system in subfloors, walls or ceilings according to the invention will become apparent from the following description of preferred embodiments thereof, given only by way of non-limiting, indicative example, with reference to the accompanying drawings, in which.

Equal or similar elements are indicated with the same numerals in the aforesaid FIGS. 1 to 3.

DETAILED DESCRIPTION OF PREFERRED EMBODIMENTS

Figure 1:
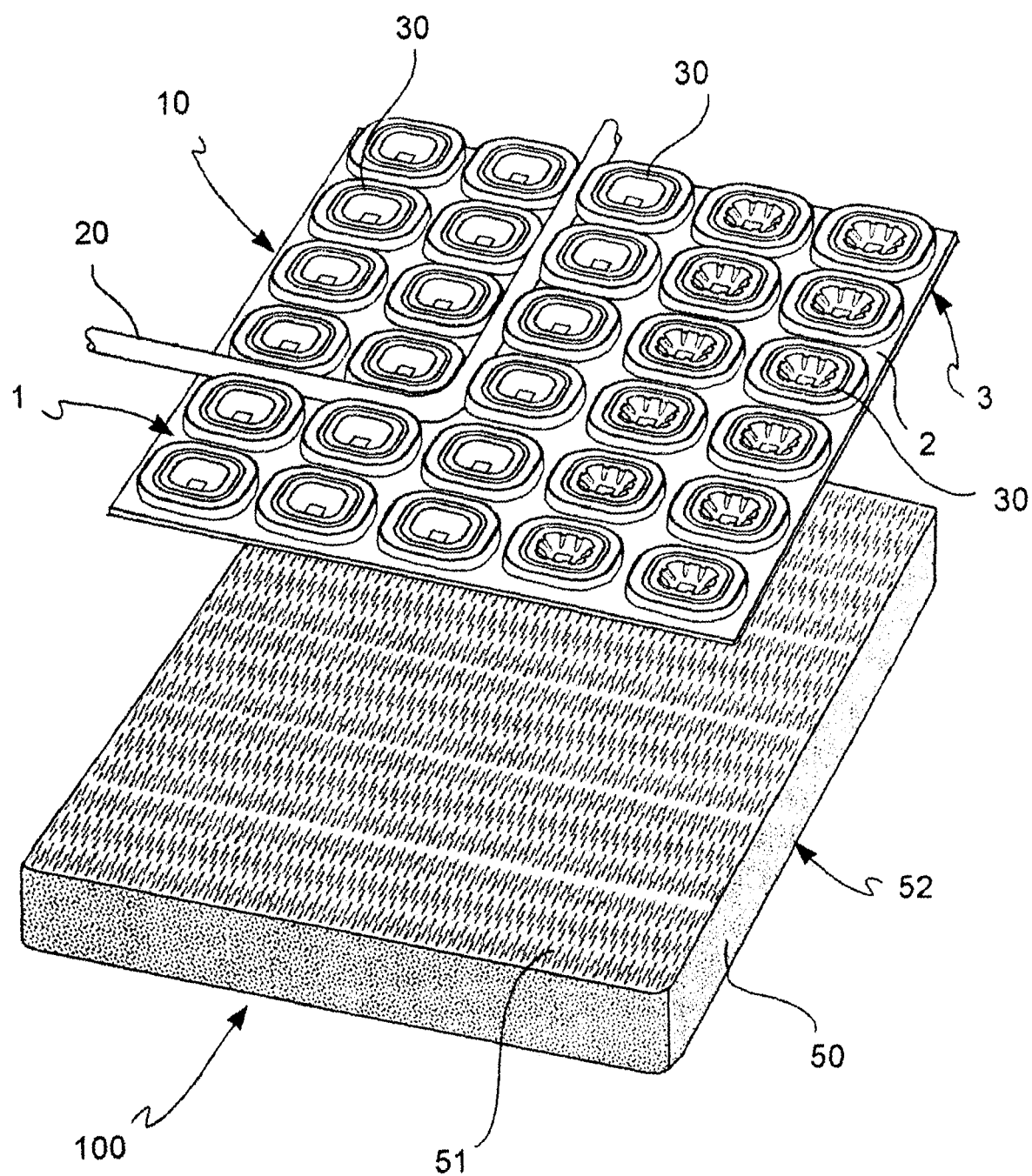
FIG. 1 shows a perspective and enlarged view of an exemplary embodiment of a device for supporting and fastening heating pipes for the installation of a heating system in subfloors, walls or ceilings of a building, which can be fastened for example to the screed.

With reference to FIG. 1, an example of a device for supporting and fastening heating pipes 20 of a heating system placed in subfloors, walls or ceilings of a building is indicated with reference numeral 10.

In a first exemplary embodiment of a floor heating system, the device 10 for supporting and fastening one or more of the aforesaid heating pipes 20 is fastened, e.g. glued, above a cement screed. Such a screed is positioned directly on a slab or alternatively on a layer of thermal insulation interposed between such a slab and the cement screed itself.

In a second exemplary embodiment of the floor heating system, in relation to FIG. 1, the aforesaid device 10 for supporting and fastening heating pipes 20 can be fastened to an insulating layer 50 of a thermal insulation panel 100 accommodated below the floor.

In greater detail, in relation to such a second example, such a panel 100 comprises a layer 50 in a thermally insulating material including a first surface 51 and an opposite second surface 52. The above-mentioned device 10 for supporting and fastening heating pipes 20 to the panel is fastened, e.g. glued, to one of such first 51 and second 52 surfaces of the insulating layer 50. In an exemplary embodiment, the insulating layer 50 of panel 100 comprises polyurethane foam (PUR-PIR).

The tiles or other coverings of the useable floor are fastened above device 10.

In a wall heating system, such insulation panels 100, including the device 10 for supporting and fastening one or more of the heating pipes 20 of the invention, are accommodated in cavities obtained in the walls, that is they are positioned on planes orthogonal to the plane of the slab in dry applications, associated for example with other covering panels made of materials such as plasterboard or calcium silicate. It is worth noting that a wall heating system may comprise only the device 10 for supporting and fastening heating pipes 20 of the invention and the heating pipes 20 themselves, that is without such a device 10 being fastened to an insulating layer of an insulation panel.

Moreover, the device 10 for supporting and fastening heating pipes 20 of the invention may also be used in ceiling heating systems for providing radiant panels fastened to the ceiling or accommodated in suitable compartments made in the ceiling.

It is worth noting that the word heating pipes 20 is used to indicate both the coil piping in which heated water (or other fluids) flows of floor heating systems of hydropic or water type, and the electric heating cables or electric heating wires of electric floor heating systems.

Preferably, for simplicity of disclosure, reference is explicitly made to an electric floor heating system in the continuation of the description. However, the advantages of the present invention are also applicable to water heating systems which use coil piping in which heated water (or other fluids) flows.

In reference to FIG. 1, the device 10 for supporting and fastening heating pipes 20 comprises a laminar body or foil 1 having a first face 2 and an opposite second face 3.

Moreover, device 10 comprises a plurality of fastening elements 30 made in one piece on the first face of the laminar body 1 and configured to fasten the heating pipes 20 on the first face 2 itself.

In the example in FIG. 1, such fastening elements are a plurality of reliefs or bosses 30 spaced apart equally from one another on the first face 2 of the laminar body 1, which protrude from the first face 2.

In the example in FIG. 1, each boss 30 has a section with a plane parallel to laminar body 2 itself, which is substantially square in shape with rounded corners. Such bosses 30 of the laminar body 1 are configured to reversibly fasten the electric heating wires 20 on the first face 2 of the laminar body.

It is worth noting that the fastening elements 30 of the heating pipes 20 may also have different shapes.

Advantageously, both the laminar body 1 and the fastening elements 30 of device 10 are in a mixture comprising at least one thermoplastic polymer and thermally conductive inorganic fillers.

In one exemplary embodiment, the inorganic fillers of the mixture comprise graphite.

In a different exemplary embodiment, the inorganic fillers comprise ceramics.

For example, such ceramics are selected from the group consisting of: Magnesia (MgO), Zirconia ($ZrO_2$), Alumina ($Al_2O_3$), Mullite ($3Al_2O_3$-$2SiO_2$), Silicon carbide (SiC), Silica glass ($SiO_2$), Silicon nitride ($Si_3N_4$) Aluminum nitride (AlN), Boron nitride (BN).

In an alternative exemplary embodiment, the inorganic fillers of the mixture comprise one or more conductive materials selected from the group consisting of: metal powders, conductive pastes, metal wires.

Moreover, in a different exemplary embodiment, the mixture which already comprises the polymer and the inorganic fillers, graphite or ceramic, may also have added one or more of the above-mentioned conductive materials, that is metal powders, conductive pastes or metal wires. Additionally, conductive inks may be deposited, e.g. spread, over the surface of the finished device 10.

The Applicant has observed that the use of such inorganic fillers improves the transport by the support and fastening device 10 of the heat generated by means of the heating pipes 20, towards the rooms of the building to be heated. This is attributed to the thermal conductivity of the inorganic fillers $\lambda_c$ selected and dispersed in the polymer mixture which is greater than the thermal conductivity of the thermoplastic polymer $\lambda_{po}$.

Below are certain examples of values of thermal conductivity $\lambda_c$ of certain ceramic materials which form the inorganic fillers of the mixture:

Magnesia (MgO): 37.7 W/mK,
Zirconia ($ZrO_2$): 2.9 W/mK,
Alumina ($Al_2O_3$): 35-39 W/mK,
Mullite ($3Al_2O_3$-$2SiO_2$): 6.1 W/mK,
Silicon carbide (SiC): from 71 to 490 W/mK,
Silica glass ($SiO_2$): 1.4 W/mK,
Silicon nitride ($Si_3N_4$): 10-33 W/mK,
Aluminum nitride (AlN): 50-170 W/mK.

Graphite has a thermal conductivity between 50 and 100 W/mK according to the various types of graphite used.

As is known, the thermal conductivity (indicated with $\lambda$) of a material is the ratio, under stationary conditions, between the flow of heat (that is the quantity of heat transferred in the unit of time through the surface unit) and the temperature gradient which induces the passage of the heat in the case of thermal conduction (disregarding the contributions to the transfer of heat by convection and radiation). In other words, the thermal conductivity is a measurement of the attitude of a material to transmit the heat (the greater the value λ, the less insulating the material) and depends only on the nature of the material itself.

In particular, the thermal conductivity of a generic thermoplastic polymer $\lambda_{po}$, such as e.g. polypropylene (PP), is from about 0.1 to 0.3 W/mK. In the case of the above-mentioned mixture comprising at least one thermoplastic polymer and the aforesaid inorganic fillers, there is an increase of the thermal conductivity of the mixture $\lambda_{mix}$ up to values between 2 and 10 W/mK.

In particular, the Applicant has observed significant increases in the thermal conductivity of the mixture $\lambda_{mix}$ when the inorganic fillers used are graphite.

It is worth noting that the at least one thermoplastic polymer of the mixture is selected from the group consisting of:
 polypropylene (PP);
 low-density polyethylene (LDPE) or high-density polyethylene (HDPE);
 polyphenylene sulfide (PPS);
 polyamide (PA);
 thermoplastic polyurethane (TPU);
 thermoplastic polyolefin (TPO);
 ethylene vinyl acetate (EVA);
 polyvinyl chloride (PVC);
 rubber;
 polyethylene terephthalate (PET);
 combination of polymers.

The best results are obtained by selecting the thermoplastic polymer of the mixture, preferably in the group consisting of: polypropylene (PP), low-density polyethylene (LDPE) or high-density polyethylene (HDPE), polyphenylene sulfide (PPS), polyamide (PA), thermoplastic polyurethane (TPU).

According to the invention, the mixture with which the support and fastening device 10 is made comprises the inorganic fillers in a concentration between 5% and 80% by weight on the total of the mixture.

The Applicant has proven that the particularly advantageous effects in terms of increase of the thermal conductivity of the mixture $\lambda_{mix}$ are obtained when the concentration of the inorganic fillers of the mixture is 30% by weight on the total of the mixture. Even more advantageous effects are obtained when the concentration of the inorganic fillers of the mixture is 50% by weight on the total of the mixture.

The Applicant has performed experimental tests to compare the thermal conductivity of a support and fastening device made of a standard polymer, or standard device 10A, with the thermal conductivities of similar support devices, devices 10B, 10C, 10D, made by using a mixture comprising at least one polymer and the aforesaid inorganic fillers, graphite in the case examined.

In particular, a first 10B, a second 10C and a third 10D different support and fastening device made by means of mixtures in which the concentration of inorganic fillers is by a weight percentage of 10%, 30% and 50%, respectively, on the total of the mixture, were examined.

The samples of standard device 10A and of the first 10B, the second 10C and the third 10D device were fastened on an insulating sublayer, e.g. an insulating layer 50.
An electric cable 20 commonly used in electric floor heating systems was used as heating pipe.

There was applied a voltage in alternating current on such a cable, configured to generate a power of about 0.13 W/cm (3.96 W/ft), which was kept constant during the tests.

Figure 2:
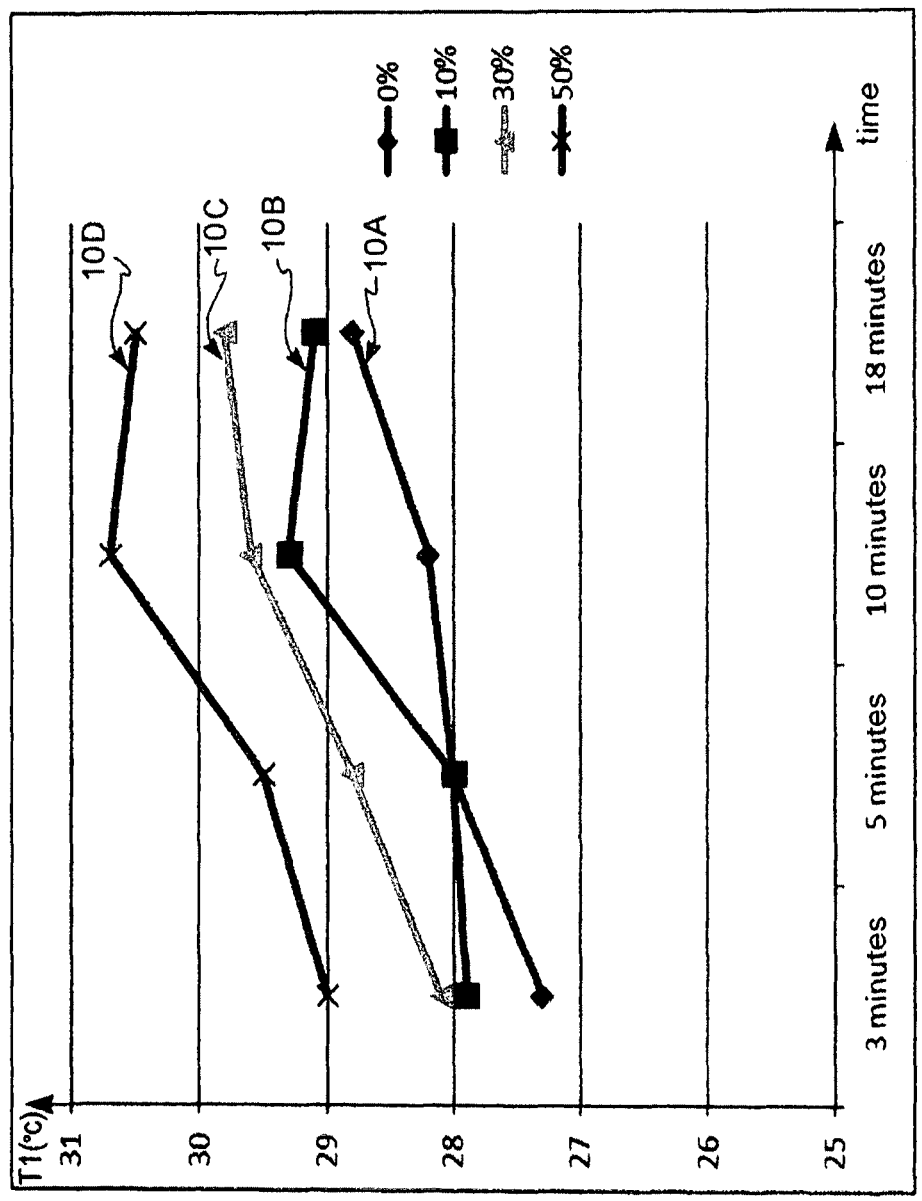
FIG. 2 graphically shows values of the surface temperature of the device for supporting and fastening heating pipes in FIG. 1 measured at preset time intervals, for various concentration values of inorganic fillers in the mixture of the device and when there are no such fillers.
Figure 3:
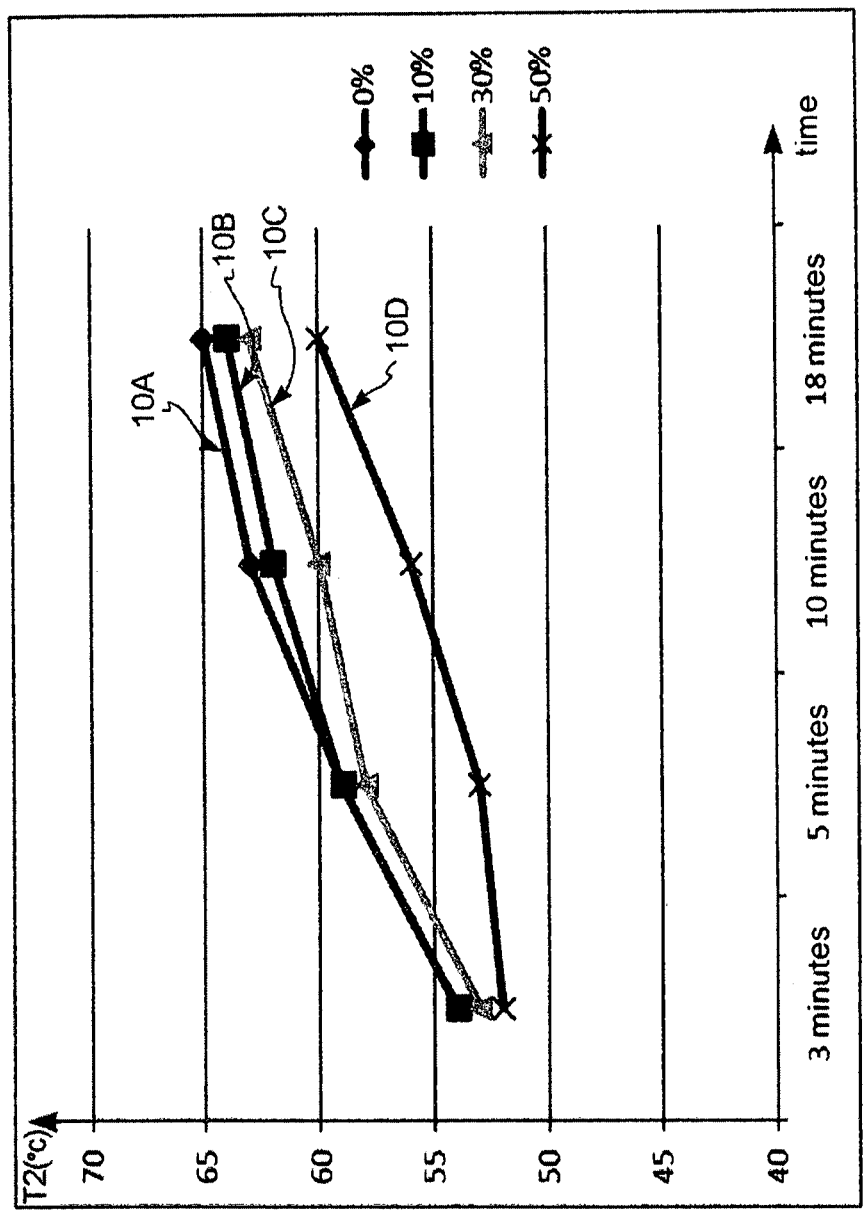
FIG. 3 graphically shows values of the surface temperature of the heating pipe in FIG. 1, measured at preset time intervals, for various concentration values of inorganic fillers in the mixture of the device and when there are no such fillers.

The results of such experimental tests are shown in the graphs in FIGS. 2 and 3.

In particular, FIG. 2 shows reasonable values of the surface temperature T1 (in ° C.) taken on the polymer laminar body 1 at 2 cm from the heating cable 20 for the four samples of support and fastening devices 10A, 10B, 10C, 10D examined.

Such a temperature T1 was taken at predetermined time intervals: in the case examined, after 3 minutes, after 5 minutes, after 10 minutes and after 18 minutes from the application of the voltage in the heating cable 20.

FIG. 3 shows discrete values of the surface temperature T2 (in ° C.) of the heating cable 20 for the four samples of support and fastening devices 10A, 10B, 10C, 10D examined.

Such a temperature T2 was taken at predetermined time intervals: in the case examined, after 3 minutes, after 5 minutes, after 10 minutes and after 18 minutes from the application of the voltage in the heating cable 20.

The values of the surface temperatures T1 taken for the four samples of support and fastening devices 10a, 10B, 10C, 10D are summarized in Table 1.

TABLE 1

| Percentage of filler in the polymer | 3 minutes | 5 minutes | 10 minutes | 18 minutes |
|---|---|---|---|---|
| 0% | 27.3 | 28 | 28.2 | 28.8 |
| 10% | 27.9 | 28 | 29.3 | 29.1 |
| 30% | 28.1 | 28.8 | 29.6 | 29.8 |
| 50% | 29 | 29.5 | 30.7 | 30.5 |

The values of the surface temperatures T2 of cable 20 taken for the four samples of support and fastening devices 10a, 10B, 10C, 10D are summarized in Table 2.

TABLE 2

| Percentage of filler in the polymer | 3 minutes | 5 minutes | 10 minutes | 18 minutes |
|---|---|---|---|---|
| 0% | 54 | 59 | 63 | 65 |
| 10% | 54 | 59 | 62 | 64 |
| 30% | 53 | 58 | 60 | 63 |
| 50% | 52 | 53 | 56 | 60 |

The analysis of the temperature values T1 and T2 taken highlighted a precise trend of the temperature values of the surface of the samples 10A, 10B, 10C, 10D and of the heating cable.

Generally, already after 10 minutes from the application of the voltage in the heating cable 20, a temperature value T1 of about 30.7° C. was measured on the sample of the third device 10D containing the inorganic fillers, that is 2.5° C. higher with respect to the surface temperature T1=28.2° C. detected on the sample 10A of the device made of standard plastic material.

After the same time interval, the temperature value measured on cable 20 positioned on the sample of the third device 10D is T2=56°, that is about 7° C. lower with respect to the temperature T2=63° C. detected on the heating cable 20 positioned on sample 10A of device made of standard polymer.

Such results demonstrate the efficiency of the support and fastening device 10 of the present invention in diffusing the heat and in the tendency to standardize the temperature over the whole surface of the support and fastening laminar body 10.

In other words, with the support and fastening devices 10 of the invention made by means of mixtures of at least one polymer and thermally conductive inorganic fillers, the efficiency in transporting heat of the floor or wall heating system is increased with respect to the conductivity values of similar systems which use traditional thermoplastic materials.

Such devices 10 promote the diffusion of the heat generated by the heating wires 20, thus promoting the transport of heat by conduction, thus promoting local phenomena of natural convection.

Moreover, the Applicant has performed a comparative analysis in terms of heat efficiency between a floor heating system using electric heating wires and comprising a support and fastening device made of a standard type polymer by comparing it with device 10 of the invention made using a mixture comprising at least one polymer and the thermally conductive graphite at 30% by weight.

In particular, the comparison was made through thermal simulations of the two radiant systems obtained by means of the aid of calculation codes to the finished elements (Finished Element Method or FEM). In the case being examined, the boundary condition set was the capacity applied to the electric heating cable of about W/m. The analyses were conducted by setting the thermal flow generated by the electrical resistance for heating the radiant surface of the device to in turn transfer heat to the room to be conditioned. For example, it was assumed to use a heating system in which the support and fastening device of the heating wires was fastened above a cement screed positioned above a layer of thermal insulation interposed between the slab and the screed itself.

The support and fastening device of the heating wires also is covered by a covering layer which is the heat exchange surface with the room to be conditioned. Such a covering is for example, made of porcelain, wood or stone.

The simulations executed have shown that by using the support and fastening device of the invention made of a conductive polymer, the distribution of the temperature over the heat exchange surface of the system is better, in particular when the covering considered is made of a material characterized by a relatively low value of thermal conductivity λ. In particular, the use of wood, characterized by a value λ=0.15 W/mK, has allowed a more uniform distribution of the temperature to be obtained over the covering of the system because the maximum temperature reached on the surface is reduced by about 2° C., while the temperature of the coldest point increased by about 2° C. This improved distribution of the temperature results in benefits in terms of heat comfort perceived in the rooms.

In addition to those already noted, the present invention has several other advantages.

Indeed, the efficiency and energy consumption of the floor, wall or ceiling heating system may be optimized with the support and fastening device 10.

Moreover, the heating of the rooms occurs in a more uniform and faster manner over all the surfaces with device 10 of the invention, thus reducing the thermal inertia of the known floor heating systems and at the same time minimizing the transitional heating step.

Moreover, the present invention ensures a reduction of the quantities of heating pipes 20 to be used, heating surface being equal.

Those skilled in the art may make several changes and adaptations to the above-described embodiments of the device for supporting and fastening heating pipes of a heating system placed in subfloors, walls or ceilings of buildings, and may replace elements with others which are functionally equivalent in order to meet contingent needs, without departing from the scope of the following claims. Each of the features described as belonging to a possible embodiment may be achieved irrespective of the other embodiments described.

The invention claimed is:

1. A device for supporting and fastening heating pipes of a heating system placed in subfloors, walls or ceilings of a building, said device comprising:
   a laminar body having a first face and an opposite second face,
   a plurality of reliefs or bosses spaced apart equally from one another on the first face of the laminar body, protruding from the first face of the laminar body and configured to fasten said heating pipes on the first face,
   wherein each relief or boss has a section, with a plane parallel to a base surface plane of the laminar body, which is square in shape with rounded corners,
   wherein both the laminar body and the reliefs or bosses of the device are made of a mixture comprising:
      at least one thermoplastic polymer,
      thermally conductive inorganic fillers consisting of graphite or ceramics, and
      one or more conductive materials selected from the group consisting of: conductive pastes and metal wires, and
   the device comprises conductive inks spread over the laminar body and the reliefs or bosses of the device; and
   wherein a concentration of the thermally conductive inorganic fillers in the mixture is selected from the group consisting of:
      30% by weight of the total mixture, and
      50% by weight of the total mixture.

2. The device for supporting and fastening heating pipes according to claim 1, wherein said ceramics are selected from the group consisting of: Magnesia (MgO), Zirconia (ZrO$_2$), Alumina (Al$_2$O$_3$), Mullite (3Al$_2$O$_3$-2SiO$_2$), Silicon carbide (SiC), Silica glass (SiO$_2$), Silicon nitride (Si$_3$N$_4$) Aluminum nitride (AlN), and Boron nitride (BN).

3. The device for supporting and fastening heating pipes according to claim 1, wherein said at least one thermoplastic polymer is selected from the group consisting of:
   polypropylene (PP);
   low-density polyethylene (LDPE) or high-density polyethylene (HDPE);
   polyphenylene sulfide (PPS);
   polyamide (PA);
   thermoplastic polyurethane (TPU);
   thermoplastic polyolefin (TPO);
   ethylene vinyl acetate (EVA);
   polyvinyl chloride (PVC);
   polyethylene terephthalate (PET); and
   rubber.

4. An insulation panel for the installation of floor or wall heating systems, comprising:
   a layer in a thermally insulating material including a first surface and an opposite second surface;
   a device for supporting and fastening heating pipes to the panel fastened to one of said first and second surfaces of the insulating layer, the device comprising:

a laminar body having a first face and an opposite second face, a plurality of reliefs or bosses spaced apart equally from one another on the first face of the laminar body, protruding from the first face of the laminar body and configured to fasten said heating pipes on the first face, wherein each relief or boss has a section, with a plane parallel to a base surface plane of the laminar body, which is square in shape with rounded corners, wherein both the laminar body and the reliefs or bosses of the device are made of a mixture comprising:
  at least one thermoplastic polymer,
  thermally conductive inorganic fillers consisting of graphite or ceramics, and
  one or more conductive materials selected from the group consisting of: conductive pastes and metal wires, and the device comprises conductive inks spread over the laminar body and the reliefs or bosses of the device; and wherein a concentration of the thermally conductive inorganic fillers in the mixture is selected from the group consisting of:
  30% by weight of the total mixture, and
  50% by weight of the total mixture.

5. A heating system placed in subfloors, walls or ceilings of a building comprising:

a device for supporting and fastening heating pipes comprising:
  a laminar body having a first face and an opposite second face,
  a plurality of reliefs or bosses spaced apart equally from one another on the first face of the laminar body, protruding from the first face of the laminar body and configured to fasten said heating pipes on the first face,
  wherein each relief or boss has a section, with a plane parallel to a base surface plane of the laminar body, which is square in shape with rounded corners,
  wherein both the laminar body and the reliefs or bosses of the device are made of a mixture comprising:
    at least one thermoplastic polymer,
    thermally conductive inorganic fillers consisting of graphite or ceramics, and
    one or more conductive materials selected from the group consisting of: conductive pastes and metal wires, and
  the device comprises conductive inks spread over the laminar body and the reliefs or bosses of the device; and
  wherein a concentration of the thermally conductive inorganic fillers in the mixture is selected from the group consisting of:
    30% by weight of the total mixture, and
    50% by weight of the total mixture; and
one or more heating pipes fastened to said device.

6. The heating system according to claim 5, wherein said system is an electric heating system and said one or more heating pipes are electric heating wires.

7. The heating system according to claim 5, wherein said system is a heating system of hydronic type and said one or more heating pipes are coil piping in which heated water flows.

* * * * *